United States Patent
Dadvand et al.

(10) Patent No.: US 8,936,857 B2
(45) Date of Patent: *Jan. 20, 2015

(54) COATED ARTICLES AND METHODS

(71) Applicant: Xtalic Corporation, Marlborough, MA (US)

(72) Inventors: Nazila Dadvand, Gatineau (CA); Christopher A. Schuh, Ashland, MA (US); Alan C. Lund, Ashland, MA (US); Jonathan C. Trenkle, Somerville, MA (US); John Cahalen, Somerville, MA (US)

(73) Assignee: Xtalic Corporation, Marlborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/897,594

(22) Filed: May 20, 2013

(65) Prior Publication Data
US 2013/0260176 A1    Oct. 3, 2013

Related U.S. Application Data

(60) Continuation of application No. 13/304,672, filed on Nov. 27, 2011, now Pat. No. 8,445,116, which is a division of application No. 12/723,020, filed on Mar. 12, 2010.

(51) Int. Cl.
*H01R 13/03* (2006.01)
*B32B 15/01* (2006.01)
(Continued)

(52) U.S. Cl.
CPC ............. *B32B 15/018* (2013.01); *H01R 13/03* (2013.01); *C22C 5/06* (2013.01); *C25D 3/64* (2013.01);
(Continued)

(58) Field of Classification Search
None
See application file for complete search history.

(56) References Cited

U.S. PATENT DOCUMENTS 3,463,636 A * 8/1969 Ogren ........................... 420/466
3,951,872 A * 4/1976 Neely ........................... 252/513
(Continued)

FOREIGN PATENT DOCUMENTS

JP    52-4433 Y1    1/1977
JP    08-283963 A    10/1996
(Continued)

OTHER PUBLICATIONS

Kudryavtseva ("Electrodeposition of a silver-tungsten alloy form an ammonium-sulfate electrolyte", Novocherkassk, Politekh Inst. im. Ordzhonikidze, Novocherkassk, USSR, Zashchita Metallov (1969), 5(1), 95-100). Translation included.*
(Continued)

*Primary Examiner* — John J Zimmerman
(74) *Attorney, Agent, or Firm* — Wolf, Greenfield & Sacks, P.C.

(57) ABSTRACT

Coated articles and methods for applying coatings are described. The article may include a base material and a coating comprising silver formed thereon. In some embodiments, the coating comprises a silver-based alloy, such as a silver-tungsten alloy. The coating may, in some instances, include at least two layers. For example, the coating may include a first layer comprising a silver-based alloy and a second layer comprising a precious metal. The coating can exhibit desirable properties and characteristics such as durability (e.g., wear), hardness, corrosion resistance, and high conductivity, which may be beneficial, for example, in electrical and/or electronic applications. In some cases, the coating may be applied using an electrodeposition process.

51 Claims, 2 Drawing Sheets

(51) Int. Cl.
   *C25D 3/64* (2006.01)
   *C22C 5/06* (2006.01)
   *C25D 5/12* (2006.01)
   *B32B 15/04* (2006.01)

(52) U.S. Cl.
   CPC ............... *C25D 5/12* (2013.01); *B32B 15/043* (2013.01); *Y10S 428/929* (2013.01); *Y10S 428/935* (2013.01)
   USPC .......... 428/673; 428/929; 428/935; 439/886; 439/887

(56) References Cited

U.S. PATENT DOCUMENTS

| | | | |
|---|---|---|---|
| 4,050,930 A * | 9/1977 | Motoyoshi et al. | 148/431 |
| 4,246,077 A | 1/1981 | Hradil et al. | |
| 5,225,253 A * | 7/1993 | Tung et al. | 427/566 |
| 5,831,186 A * | 11/1998 | Oswood et al. | 75/243 |
| 5,849,170 A * | 12/1998 | Djokic et al. | 205/163 |
| 6,045,682 A * | 4/2000 | Rodriguez | 205/238 |
| 6,183,545 B1 * | 2/2001 | Okuhama et al. | 106/1.18 |
| 6,312,495 B1 * | 11/2001 | Renner et al. | 75/247 |
| 6,900,461 B2 * | 5/2005 | Inoue et al. | 257/59 |
| 6,930,391 B2 * | 8/2005 | Kloster et al. | 257/741 |
| 8,445,116 B2 * | 5/2013 | Dadvand et al. | 428/673 |
| 2002/0036145 A1 * | 3/2002 | Dubin et al. | 205/296 |
| 2003/0186597 A1 * | 10/2003 | Suzuki et al. | 439/886 |
| 2005/0121330 A1 * | 6/2005 | Howell et al. | 205/157 |
| 2005/0173255 A1 * | 8/2005 | Bokisa et al. | 205/255 |
| 2005/0183961 A1 * | 8/2005 | Morrissey | 205/263 |
| 2006/0027461 A1 | 2/2006 | Heber et al. | |
| 2006/0135281 A1 * | 6/2006 | Palumbo et al. | 473/316 |
| 2006/0148339 A1 * | 7/2006 | Kaspar et al. | 439/886 |
| 2007/0081106 A1 * | 4/2007 | Cho et al. | 349/41 |
| 2007/0102070 A1 | 5/2007 | Tuma et al. | |
| 2007/0151863 A1 | 7/2007 | Morrissey | |
| 2007/0224439 A1 | 9/2007 | Holmberg | |
| 2009/0159451 A1 | 6/2009 | Tomantschger et al. | |
| 2009/0218127 A1 * | 9/2009 | Fujita | 174/389 |
| 2009/0283410 A1 * | 11/2009 | Sklar et al. | 205/103 |
| 2010/0028714 A1 * | 2/2010 | Palumbo et al. | 428/650 |
| 2011/0008646 A1 * | 1/2011 | Cahalen et al. | 428/655 |
| 2011/0220511 A1 * | 9/2011 | Dadvand et al. | 205/238 |
| 2011/0223442 A1 * | 9/2011 | Dadvand et al. | 428/673 |
| 2012/0070688 A1 | 3/2012 | Dadvand et al. | |
| 2012/0118755 A1 * | 5/2012 | Dadvand et al. | 205/238 |
| 2012/0121925 A1 * | 5/2012 | Trenkle et al. | 428/613 |
| 2012/0328904 A1 * | 12/2012 | Baskin et al. | 428/686 |

FOREIGN PATENT DOCUMENTS

| | | |
|---|---|---|
| JP | 08-287758 A | 11/1996 |
| JP | 2005-530926 A | 10/2005 |
| JP | 2007-524189 A | 8/2007 |
| JP | 2008-056950 A | 3/2008 |
| JP | 2008-524010 A | 7/2008 |
| WO | WO 97/37363 * | 10/1997 |

OTHER PUBLICATIONS

International Search Report and Written Opinion mailed May 5, 2011 for PCT/US2011/028104.

Bogush et al., Electroless deposition of novel Ag—W thin films. Microelectr Eng. Nov. 2003;70(2-4):489-94.

Eliaz et al., Synthesis and Characterization of Nickel Tungsten Alloys by Electrodeposition. Electrochimica Acta. 2005;50:2893-904.

Hu et al., Silver Diffusion and High-Temperature Lubrication Mechanisms of YSZ-Ag-Mo Based Nanocomposite. Composites Sci Tech. Mar. 2007;67(3-4):336-47.

Kudryavtseva et al., Investigation of the mechanism of electrodeposition of silver—tungsten alloy from an ammonium sulfate electrolyte. Prot Metals. 1970;6(1):61-4. English abstract only.

Office Action mailed Oct. 28, 2014 for Japanese Application No. 2012-557281.

Ye et al., Effect of sodium dodecylsulfate on improving microstructural properties of electroplated silver-oxygen-tungsten thin films. Surf Coat Technol. 2007;201:9456-61, Apr. 2007.

* cited by examiner

COATED ARTICLES AND METHODS

RELATED APPLICATIONS

This application is a continuation of U.S. application Ser. No. 13/304,672 (now U.S. Pat. No. 8,445,116), filed Nov. 27, 2011, which is a divisional of U.S. application Ser. No. 12/723,020, filed Mar. 12, 2010, which are incorporated herein by reference in their entirety.

FIELD OF INVENTION

The present invention generally relates to coated articles and related methods. In some embodiments, the coatings are metallic and are electrodeposited.

BACKGROUND OF INVENTION

Many types of coatings may be applied on a base material. Electrodeposition is a common technique for depositing such coatings. Electrodeposition generally involves applying a voltage to a base material placed in an electrodeposition bath to reduce metal ionic species within the bath which deposit on the base material in the form of a metal, or metal alloy, coating. The voltage may be applied between an anode and a cathode using a power supply. At least one of the anode or cathode may serve as the base material to be coated. In some electrodeposition processes, the voltage may be applied as a complex waveform such as in pulse deposition, alternating current deposition, or reverse-pulse deposition.

Precious metal and precious metal alloy coatings may be deposited using a process such as electrodeposition. In some applications, a coating may at least partially wear off as a result of repeated rubbing against a surface. Such an effect may be undesirable, especially when the coating is applied at least in part to improve electrical conductivity, since this effect can increase the resistance of the coating.

SUMMARY OF INVENTION

Coated articles and related methods are provided.

In one aspect, a method of depositing a coating is provided. The method comprises providing an anode, a cathode, an electrodeposition bath associated with the anode and the cathode, and a power supply connected to the anode and the cathode. The method further comprises driving the power supply to electrodeposit a coating on a base material. The coating comprises a silver-based alloy. The silver-based alloy further comprises tungsten and/or molybdenum. The silver-based alloy has an average grain size of less than 1 micron.

In another aspect, a method of depositing a coating is provided. The method comprises providing an anode, a cathode, an electrodeposition bath associated with the anode and the cathode, and a power supply connected to the anode and the cathode. The method further comprises driving the power supply to electrodeposit a coating on a base material. The coating comprises a silver-based alloy. The silver-based alloy further comprises tungsten and/or molybdenum, wherein the concentration of tungsten and/or molybdenum in the silver-based alloy is between 0.1 atomic percent and 50 atomic percent.

In yet another aspect, a method of forming an electrical connector is provided. The method comprises providing an anode, a cathode, an electrodeposition bath associated with the anode and the cathode, and a power supply connected to the anode and the cathode. The method further comprises driving the power supply to electrodeposit a coating on a conductive base material. The coating comprising a silver-based alloy. The silver-based alloy further comprising tungsten and/or molybdenum. The method further comprises forming an electrical connector from the coated conductive base material.

In still another aspect, a method of depositing a coating is provided. The method comprises providing an anode, a cathode, an electrodeposition bath associated with the anode and the cathode, and a power supply connected to the anode and the cathode. The method further comprises driving the power supply to electrodeposit a coating on a base material. The coating comprises a silver-based alloy. The silver-based alloy further comprises tungsten and/or molybdenum, wherein the coating is deposited from an aqueous solution.

In yet another aspect, an article is provided. The article comprises a base material and a coating formed on the base material, the coating comprising a silver-based alloy. The silver-based alloy further comprising tungsten and/or molybdenum, wherein the concentration of tungsten and/or molybdenum in the silver-based alloy is at least 1.5 atomic percent and the silver-based alloy has an average grain size of less than 1 micron.

In still another aspect, an article is provided. The article comprises a base material and a coating formed on the base material. The coating comprises a silver-based alloy. The silver-based alloy further comprises tungsten and/or molybdenum, wherein the silver-based alloy has an average grain size less than 50% of a thickness of the coating.

In yet another aspect, an electrical component is provided. The electrical component comprises a conductive base material and a coating formed on the base material, the coating comprising a silver-based alloy, the silver-based alloy further comprising tungsten and/or molybdenum.

In still another aspect, a bath is provided. The bath comprises silver ionic species, tungsten and/or molybdenum ionic species, and at least one complexing agent. The bath is suitable for electrodeposition processes.

In yet another aspect, an electrodeposition system is provided. The electrodeposition system comprises a bath, at least one electrode, and a power supply. The bath comprises silver ionic species, tungsten and/or molybdenum ionic species, and at least one complexing agent/The bath is associated with the at least one electrode, wherein the power supply is connected to the at least one electrode.

Other aspects, embodiments and features of the invention will become apparent from the following detailed description when considered in conjunction with the accompanying drawings. The accompanying figures are schematic and are not intended to be drawn to scale. For purposes of clarity, not every component is labeled in every figure, nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

DETAILED DESCRIPTION

Coated articles and methods for applying coatings are described. The article may include a base material and a coating comprising silver formed thereon. In some embodiments, the coating comprises a silver-based alloy, such as a silver-tungsten alloy. The coating may, in some instances, include at least two layers. For example, the coating may include a first layer comprising a silver-based alloy and a second layer comprising a precious metal. The coating can exhibit desirable properties and characteristics such as durability (e.g., wear), hardness, corrosion resistance, and high conductivity, which may be beneficial, for example, in electrical and/or electronic applications. In some cases, the coating may be applied using an electrodeposition process.

Figure 1:
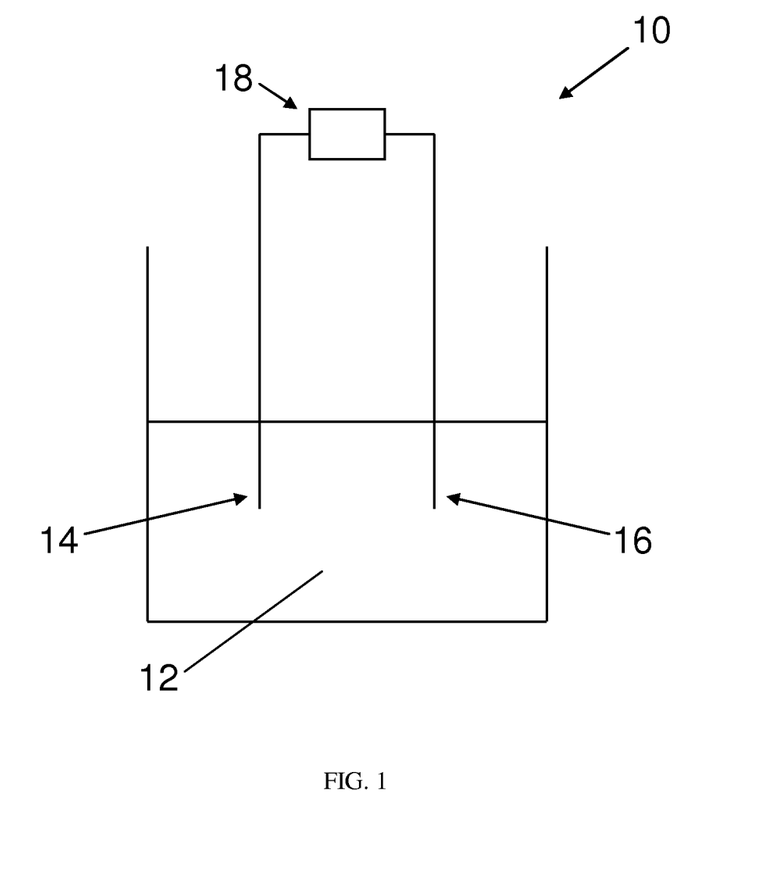
FIG. 1 shows an electrodeposition system according to an embodiment.

FIG. 1 shows an electrodeposition system 10 according to an embodiment. System 10 includes a electrodeposition bath 12. As described further below, the bath includes the metal sources used to form the coating and one or more additives. An anode 14 and cathode 16 are provided in the bath. A power supply 18 is connected to the anode and the cathode. During use, the power supply generates a waveform which creates a voltage difference between the anode and cathode. The voltage difference leads to reduction of metal ionic species in the bath which deposit in the form of a coating on the cathode, in this embodiment, which also functions as the substrate.

It should be understood that the illustrated system is not intended to be limiting and may include a variety of modifications as known to those of skill in the art.

The electrodeposition baths comprise a fluid carrier for the metal source(s) and additive(s). In some embodiments, the fluid carrier is water (i.e., the bath is an aqueous solution). However, it should be understood that other fluid carriers may also be used such as molten salts, cryogenic solvents, alcohol baths, amongst others. In some embodiments, the fluid carrier is a mixture of water and at least one organic solvent (i.e., an aqueous bath may contain at least some organic solvent). Those of ordinary skill in the art are able to select suitable fluid carriers.

The baths include suitable metal sources for depositing a coating with the desired composition. When depositing a metal alloy, it should be understood that all of the metal constituents in the alloy have sources in the bath. The metal sources are generally ionic species that are dissolved in the fluid carrier. As described further below, during the electrodeposition process, the ionic species are deposited in the form of a metal, or metal alloy, to form the coating. In general, any suitable ionic species can be used. The ionic species may be provided from metal salts. For example, silver nitrate, silver sulfate, silver sulfamate may be used to provide the silver ionic species when depositing a coating comprising silver; sodium tungstate, ammonium tungstate, tungstic acid, etc. may be used to provide the tungsten ionic species when depositing a coating comprising tungsten. In some cases, the ionic species may comprise molybdenum. Sodium molybdate, ammonium molybdate, molybdenum oxide, etc. may be used to provide the molybdenum ionic species when depositing a coating comprising molybdenum. It should be understood that these ionic species are provided as examples and that many other sources are possible. Any suitable concentration of a metal species may be used, and one of ordinary skill in the art will be able to select a suitable concentration by routine experimentation. In some embodiments, the ionic species in the bath may have a concentration between 0.1 g/L and 100 g/L, between 5 g/L and 50 g/L, or between 1 and 20 g/L.

In some embodiments, the bath includes a substituted pyridine compound. A substituted pyridine compound comprises a pyridine ring, where at least one hydrogen of the pyridine ring is replaced with substituent comprising a functional group. The substituent may comprise any suitable functional group. Non-limiting examples of a functional group include an amide, an ester, an ether, a carbonyl, an amine, an alcohol, or combinations thereof. Those of ordinary skill in the art will be able to identify other functional groups. A substituted pyridine may comprise at least one substituent, at least two substituents, at least three substituents, at least four substituents, or at least five substituents. One example of a substituted pyridine compound is nicotinamide. As one of ordinary skill in the art will recognize, nicotinamide has one substituent, the substituent being an amide functional group.

As described herein, the electrodeposition baths may include one or more additives that may improve the electrodeposition process and/or quality of coatings. For example, the electrodeposition bath may comprise at least one complexing agent (i.e., a complexing agent or mixture of complexing agents). A complexing agent refers to any species which can coordinate with the ions contained in the solution. In some embodiments, a complexing agent or mixture of complexing agents may permit codeposition of at least two elements. For example, a complexing agent or mixture of complexing agents may permit codeposition of silver and tungsten.

The complexing agent may be an organic species, such as a citrate ion, a compound comprising an imide functional group, or a substituted pyridine compound. The complexing agent may be an inorganic species, such as an ammonium ion. In some cases, the complexing agent is a neutral species. In some cases, the complexing agent is a charged species (e.g., negatively charged ion, positively charged ion). Examples of complexing agents include citrates, gluconates, tartrates, and other alkyl hydroxyl carboxylic acids; cyanide; hydantoins (e.g., 5,5-dimethylhydantoin), succinimides (e.g., succinimide), and other compounds comprising an imide functional group; and substituted pyridine compounds (e.g., nicotinamide).

Generally, a complexing agent, or mixture of complexing agents, may be included in the electrodeposition bath within a concentration range of 0.1-200 g/L, and, in some cases, within the range of 40-80 g/L. In one embodiment, the mixture of complexing agents comprises 5,5-dimethylhydantoin, citric acid, and nicotinamide. When the complexing agent is a compound comprising an imide functional group, the concentration of the complexing agent may be within the range 30-70 g/L or 40-60 g/L. When the complexing agent is an alkyl hydroxyl carboxylic acid, the concentration of the complexing agent may, in some instances, be within the range 1-20 g/L or 5-15 g/L. When the complexing agent is a substituted pyridine compound, the concentration of the complexing agent may be within the range 0.5-20 g/L or 0.5-5 g/L. Concentrations outside these ranges may be used, and those of ordinary skill in the art will readily be able to determine suitable concentrations by routine experimentation.

In some embodiments, ammonium ions may be incorporated into the electrolyte bath as complexing agents and to adjust solution pH. For example, the electrodeposition bath may comprise ammonium ions in the range of 1-50 g/L, and within the range of 10-30 g/L. Other concentration ranges may also be suitable.

In some cases, the baths may include at least one wetting agent. A wetting agent refers to any species capable of reducing the surface tension of the electrodeposition bath and/or increasing the ability of gas bubbles to detach from surfaces in the bath. For example, the substrate may comprise a hydrophilic surface, and the wetting agent may enhance the compatibility (e.g., wettability) of the bath relative to the substrate. In some cases, the wetting agent may also reduce the number of defects within the metal coating that is produced.

The wetting agent may comprise an organic species, an inorganic species, an organometallic species, or combinations thereof. In some embodiments, the wetting agent may be selected to exhibit compatibility (e.g., solubility) with the eletrodeposition bath and components thereof. For example, the wetting agent may be selected to include one or more hydrophilic species, including amines, thiols, alcohols, carboxylic acids and carboxylates, sulfates, phosphates, polyethylene glycols (PEGs), or derivatives of polyethylene glycol, to enhance the water solubility of the wetting agent. In some embodiments, the wetting agent may comprise a fluorosurfactant. In some embodiments, the wetting agent may include Zonyl® FSJ (Dupont) or Captsone™ (Dupont).

Any suitable concentration of wetting agent may be used. For example, the concentration of wetting agent may be between 10 microliters/L and 2000 microliters/L, between 20 microliters/L and 1000 microliters/L, or between 50 microliters/L and 500 microliters/L. Other concentration ranges may also be suitable.

Those of ordinary skill in the art would be able to select the appropriate combination of ionic species, wetting agent, complexing agent and/or other additives suitable for use in a particular application. Generally, the additives in a bath are compatible with electrodeposition processes, i.e., a bath may be suitable for electrodeposition processes. One of ordinary skill in the art would be able to recognize a bath that is suitable for electrodeposition processes Likewise, one of ordinary skill in the art would be able to recognize additives that, when added to a bath, would make the bath not suitable for electrodeposition processes.

In some aspects, various techniques can be used to monitor the contents of the electrodeposition baths. For example, the techniques may determine the concentration of one or more of the additives in the bath such as the brightening agent(s), wetting agent(s), complexing agent(s), etc. If the concentration of the additive(s) is below or above a desired concentration, the bath composition may be adjusted so that the concentration lies within the desired range.

The pH of the electrodeposition bath can be from about 2.0 to 12.0. In some cases, the electrodeposition bath may have a pH from about 7.0 to 9.0, or, in some cases, from about 7.6 to 8.4, or, in some cases, from about 7.9 to 8.1. However, it should be understood that the pH may be outside the above-noted ranges. The pH of the bath may be adjusted using any suitable agent known to those of ordinary skill in the art. In some embodiments, the pH of the bath is adjusted using a base, such as a hydroxide salt (e.g., potassium hydroxide). In some embodiments, the pH of the bath is adjusted using an acid (e.g., nitric acid).

In some cases, the operating range for the electrodeposition baths described herein is 5-100° C., 10-70° C., 10-30° C., or, in some cases, 40-70° C. However, it should be understood that other temperature ranges may also be suitable.

In general, the electrodeposition baths can be used in connection with any electrodeposition process. Electrodeposition generally involves the deposition of a coating on a substrate by contacting the substrate with an electrodeposition bath and flowing electrical current between two electrodes through the electrodeposition bath, i.e., due to a difference in electrical potential between the two electrodes. For example, methods described herein may involve providing an anode, a cathode, an electrodeposition bath associated with (e.g., in contact with) the anode and cathode, and a power supply connected to the anode and cathode. In some cases, the power supply may be driven to generate a waveform for producing a coating, as described more fully below. In some embodiments, at least one electrode may serve as the substrate to be coated.

In general, during an electrodeposition process an electrical potential may exist on the substrate to be coated, and changes in applied voltage, current, or current density may result in changes to the electrical potential on the substrate. In some cases, the electrodeposition process may include the use of waveforms comprising one or more segments, wherein each segment involves a particular set of electrodeposition conditions (e.g., current density, current duration, electrodeposition bath temperature, etc.). The waveform may have any shape, including square waveforms, non-square waveforms of arbitrary shape, and the like. In some methods, such as when forming coatings having different portions, the waveform may have different segments used to form the different portions. However, it should be understood that not all methods use waveforms having different segments.

In some embodiments, a coating, or portion thereof, may be electrodeposited using direct current (DC) deposition. For example, a constant, steady electrical current may be passed through the electrodeposition bath to produce a coating, or portion thereof, on the substrate. In some embodiments, the potential that is applied between the electrodes (e.g., potential control or voltage control) and/or the current or current density that is allowed to flow (e.g., current or current density control) may be varied. For example, pulses, oscillations, and/or other variations in voltage, potential, current, and/or current density, may be incorporated during the electrodeposition process. In some embodiments, pulses of controlled voltage may be alternated with pulses of controlled current or current density. In some embodiments, the coating may be formed (e.g., electrodeposited) using pulsed current electrodeposition, reverse pulse current electrodeposition, or combinations thereof.

In some cases, a bipolar waveform may be used, comprising at least one forward pulse and at least one reverse pulse, i.e., a "reverse pulse sequence." As noted above, the electrodeposition baths described herein are particularly well suited for depositing coatings using complex waveforms such as reverse pulse sequences. In some embodiments, the at least one reverse pulse immediately follows the at least one forward pulse. In some embodiments, the at least one forward pulse immediately follows the at least one reverse pulse. In some cases, the bipolar waveform includes multiple forward pulses and reverse pulses. Some embodiments may include a bipolar waveform comprising multiple forward pulses and reverse pulses, each pulse having a specific current density and duration. In some cases, the use of a reverse pulse sequence may allow for modulation of composition and/or grain size of the coating that is produced.

The methods of the invention may utilize certain aspects of methods described in U.S. Patent Publication No. 2006/02722949, entitled "Method for Producing Alloy Deposits and Controlling the Nanostructure Thereof using Negative Current Pulsing Electro-deposition, and Articles Incorporating Such Deposits," which is incorporated herein by reference in its entirety. Aspects of other electrodeposition methods may also be suitable including those described in U.S. Patent Publication No. 2006/0154084 based on U.S. application Ser. No. 11/985,569, entitled "Methods for Tailoring the Surface Topography of a Nanocrystalline or Amorphous Metal or Alloy and Articles Formed by Such Methods", filed Nov. 15, 2007, and U.S. Patent Publication No. 2009/0286103 based on U.S. patent application Ser. No. 12/120,564, filed May 14, 2008 which are incorporated herein by reference in their entireties.

A coating may be applied using an electrodeposition process at a current density of at least 0.001 A/cm$^2$, at least 0.01 A/cm$^2$, or at least 0.02 A/cm$^2$. Current densities outside these ranges may be used as well.

The deposition rate of the coating may be controlled. In some instances, the deposition rate may be at least 0.1 microns/minute, at least 0.3 microns/minute, at least 1 micron/minute, or at least 3 microns/minute. Deposition rates outside these ranges may be used as well.

Those of ordinary skill in the art would recognize that the electrodeposition processes described herein are distinguishable from electroless processes which primarily, or entirely, use chemical reducing agents to deposit the coating, rather than an applied voltage. The electrodeposition baths described herein may be substantially free of chemical reducing agents that would deposit coatings, for example, in the absence of an applied voltage.

Figure 2:
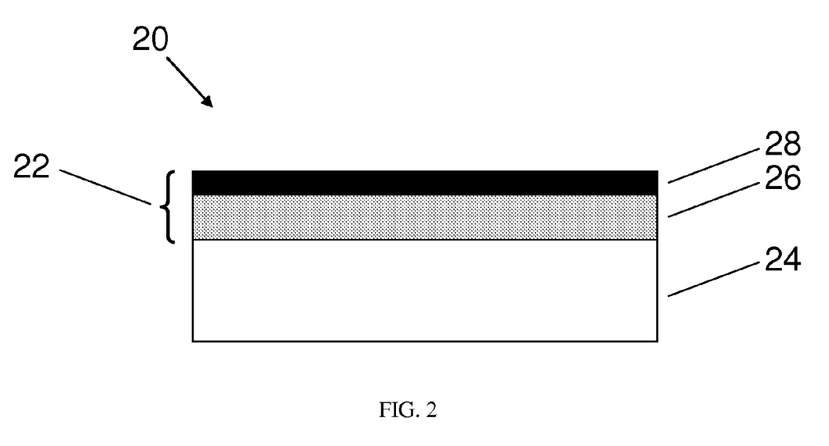
FIG. 2 shows an article according to an embodiment.

FIG. 2 shows an article 20 according to an embodiment. The article has a coating 22 formed on a base material 24. In some embodiments, the coating comprises a plurality of layers. In some embodiments, the coating may comprise a first layer 26 formed on the base material and a second layer 28 formed on the first layer. Each layer may be applied using a suitable process, as described in more detail below. It should be understood that the coating may include more than two layers. It should also be understood that the coating may include only one layer. However, in some embodiments, the coating may only include two layers, as shown. In some cases, the coating may be formed on at least a portion of the substrate surface. In other cases, the coating covers the entire substrate surface.

In some embodiments, the coating comprises one or more metals. For example, the coating may comprise a metal alloy. In some cases, alloys that comprise silver (i.e., silver-based alloys) are preferred. Such alloys may also comprise tungsten and/or molybdenum. Silver-tungsten alloys may be preferred in some cases. In some cases, the atomic percent of tungsten and/or molybdenum in the alloy may be between 0.1 atomic percent and 50 atomic percent; and, in some cases, between 0.1 atomic percent and 20 atomic percent. In some embodiments, the atomic percent of tungsten and/or molybdenum in the alloy may be at least 0.1 atomic percent, at least 1 atomic percent, at least 1.5 atomic percent, at least 5 atomic percent, at least 10 atomic percent, or at least 20 atomic percent. Other atomic percentages outside of this range may be used as well.

In some embodiments, the silver-based alloy may form first layer 26 of the coating. In some embodiments, second layer 28 comprising one or more precious metals may form a second layer of the coating. In some cases, the first layer comprising a silver alloy is formed on the base material, and the second layer comprising one or more precious metals is formed on the first layer. Examples of suitable precious metals include Ru, Os, Rh, Re, Ir, Pd, Pt, Ag, Au, or any combination thereof. Gold may be preferred in some embodiments. In some embodiments, a layer consists essentially of one precious metal. In some embodiments, it may be preferable that a layer (e.g., the second layer) is free of tin. In other cases, a layer may comprise an alloy that includes at least one precious metal and at least one other element. The element may be selected from Ni, W, Fe, B, S, Co, Mo, Cu, Cr, Zn and Sn, amongst others. For example, a layer may comprise a Ni—Pd alloy, a Au—Co alloy, and/or a Au—Ni alloy.

In some embodiments, the coating may include a layer comprising nickel (e.g., a nickel alloy such as nickel-tungsten). In some cases, the layer comprising nickel may be disposed between the base material and the silver-based alloy layer. In one embodiment, the coating comprises a first layer comprising nickel, a second layer comprising the silver-based alloy, and a third layer comprising one or more precious metals, where the first layer is formed on the base material, the second layer is formed on the first layer, and the third layer is formed on the second layer.

A layer of the coating may have any suitable thickness. In some embodiments, it may be advantageous for a layer to be thin, for example, to save on material costs. For example, a layer thickness may be less than 30 microinches (e.g., between about 1 microinch and about 30 microinches; in some cases, between about 5 microinches and about 30 microinches); in some cases the layer thickness may be less than 20 microinches (e.g., between about 1 microinch and about 20 microinches; in some cases, between about 5 microinches and about 20 microinches); and, in some cases, the layer thickness may be less than 10 microinches (e.g., between about 1 microinch and about 10 microinches; in some cases, between about 5 microinches and about 10 microinches). In some embodiments, the thickness of a layer is chosen such that the layer is essentially transparent on the surface. It should be understood that other layer thicknesses may also be suitable.

The second layer may cover the entire first layer. However, it should be understood that in other embodiments, the second layer covers only part of the first layer. In some cases, a second layer covers at least 50% of the surface area of a first layer; in other cases, at least 75% of the surface area of a first layer. In some cases, an element from a first layer may be incorporated within a second layer and/or an element from a second layer may be incorporated into a first layer.

In some embodiments, it may preferable for the first layer to be formed directly on the base material. Such embodiments may be preferred over certain prior art constructions that utilize a layer between the first layer and the base material because the absence of such an intervening layer can save on overall material costs. Though, it should be understood that in other embodiments, one or more layers may be formed between the first layer and the base material. For example, in some embodiments, a barrier layer may be formed between the base material and the first layer. The barrier layer, in some embodiments, comprises nickel. In some cases, the barrier layer comprises nickel-tungsten or sulfamate nickel.

In some embodiments, a lubricant layer may be formed as an upper portion of the coating. The lubricant layer may comprise, for example, an organic material, a self-assembled monolayer, carbon nanotubes, and the like.

In some cases, the coating (e.g., the first layer and/or the second layer) may have a particular microstructure. For example, at least a portion of the coating may have a nanocrystalline microstructure. As used herein, a "nanocrystalline" structure refers to a structure in which the number-average size of crystalline grains is less than one micron. The number-average size of the crystalline grains provides equal statistical weight to each grain and is calculated as the sum of all spherical equivalent grain diameters divided by the total number of grains in a representative volume of the body. The number-average size of crystalline grains may, in some embodiments, be less than 100 nm. In some cases, the silver-based alloy has a number-average grain size less than 50% of a thickness of the silver-based alloy layer. In some instances, the number-average grain size may be less than 10% of a thickness of the silver-based alloy layer. In some embodiments, at least a portion of the coating may have an amorphous structure. As known in the art, an amorphous structure is a non-crystalline structure characterized by having no long range symmetry in the atomic positions. Examples of amorphous structures include glass, or glass-like structures. Some embodiments may provide coatings having a nanocrystalline structure throughout essentially the entire coating. Some embodiments may provide coatings having an amorphous structure throughout essentially the entire coating.

In some embodiments, the coating may be crystalline having a face-centered cubic structure. In some embodiments, the coating may be a solid solution where the metals comprising the coating are essentially dispersed as individual atoms. Such a structure may be produced using an electrodeposition process. A solid solution may be distinguished from an alternative structure formed, for example, using an electroless process where granules comprising a first phase containing a first metal species (i.e., tungsten and/or molybdenum) are dispersed within a coating comprising a second phase containing a second metal species (i.e., silver), the second phase having a different composition and/or crystal structure than the first phase. In some cases, the solid solution may be essentially free of oxygen.

In some embodiments, the coating may comprise various portions having different microstructures. For example, the first layer may have a different microstructure than the second layer. The coating may include, for example, one or more portions having a nanocrystalline structure and one or more portions having an amorphous structure. In one set of embodiments, the coating comprises nanocrystalline grains and other portions which exhibit an amorphous structure. In some cases, the coating, or a portion thereof (e.g., a portion of the first layer, a portion of the second layer, or a portion of both the first layer and the second layer), may comprise a portion having crystal grains, a majority of which have a grain size greater than one micron in diameter. In some embodiments, the coating may include other structures or phases, alone or in combination with a nanocrystalline portion or an amorphous portion. Those of ordinary skill in the art would be able to select other structures or phases suitable for use in the context of the invention.

Advantageously, the coating (i.e., the first layer, the second layer, or both the first layer and the second layer) may be substantially free of elements or compounds having a high toxicity or other disadvantages. In some instances, it may also be advantageous for the coating to be substantially free of elements or compounds that are deposited using species that have a high toxicity or other disadvantages. For example, in some cases, the coating is free of chromium (e.g., chromium oxide), which is often deposited using chromium ionic species that are toxic (e.g., $Cr^{6+}$). In some cases, the coating may be deposited from an electrodeposition bath that is substantially free of cyanide. Such coating may provide various processing, health, and environmental advantages over certain previous coatings.

In some embodiments, metal, non-metal, and/or metalloid materials, salts, etc. (e.g., phosphate or a redox mediator such as potassium ferricyanide, or fragment thereof) may be incorporated into the coating.

The composition of the coatings, or portions or layers thereof, may be characterized using suitable techniques known in the art, such as Auger electron spectroscopy (AES), X-ray photoelectron spectroscopy (XPS), etc. For example, AES and/or XPS may be used to characterize the chemical composition of the surface of the coating.

The coating may have any thickness suitable for a particular application. For example, the coating thickness may be greater than about 1 microinch (e.g., between about 1 microinch and about 100 microinches, between about 1 microinch and 50 microinches); in some cases, greater than about 5 microinches (e.g., between about 5 microinches and about 100 microinches, between about 5 microinches and 50 microinches); greater than about 25 microinches (e.g., between about 25 microinches and about 100 microinches, between about 1 microinch and 50 microinches). It should be understood that other thicknesses may also be suitable. In some embodiments, the thickness of the coating is chosen such that the coating is essentially transparent on the surface. Thickness may be measured by techniques known to those of ordinary skill in the art.

Base material 24 may be coated to form coated articles, as described above. In some cases, the base material may comprise an electrically conductive material, such as a metal, metal alloy, intermetallic material, or the like. Suitable base materials include steel, copper, aluminum, brass, bronze, nickel, polymers with conductive surfaces and/or surface treatments, transparent conductive oxides, amongst others. In some embodiments, copper base materials are preferred.

The articles can be used in a variety of applications including electrical applications such as electrical connectors (e.g., plug-type). In some embodiments, the coating on an electrical connector includes a first layer comprising a silver alloy, the first layer disposed on a base material, and a second layer comprising a precious metal, the second layer disposed on the first layer. The coating can impart desirable characteristics to an article, such as durability, hardness, corrosion resistance, and reduced electrical resistivity. These properties can be particularly advantageous for articles in electrical applications such as electrical connectors, which may experience rubbing or abrasive stress upon connection to and/or disconnection from an electrical circuit that can damage or otherwise reduce the conductivity of a conductive layer on the article. Non-limiting examples of electrical connectors include infrared connectors, USB connectors, battery chargers, battery contacts, automotive electrical connectors, etc. In some embodiments, the presence of the first layer of a coating may provide at least some of the durability and corrosion resistance properties to the coating. In some embodiments, the coating may impart decorative qualities, for example a blue tint and reduced tarnish. Additionally, the presence of the first layer may allow the thickness of the second layer to be reduced, thereby reducing the amount of precious metal on the article significantly.

The coatings described herein may impart advantageous properties to an article, such as an electrical connector. In some embodiments, the coating, or layer of the coating, may have a low electrical resistivity. For example, the electrical resistivity may be less than 100 microohm-centimeters, less than 50 microohm-centimeters, less than 10 microohm-centimeters, or less than 2 microohm-centimeters.

The coating or layer of the coating may have a hardness of at least 1 GPa, at least 1.5 GPa, at least 2 GPa, at least 2.5 GPa, or at least 3 GPa. Those of ordinary skill in the art would readily be able to measure these properties.

As noted above, coating 20 may be formed using an electrodeposition process. In some cases, each layer of the coating may be applied using a separate electrodeposition bath. In some cases, individual articles may be connected such that they can be sequentially exposed to separate electrodeposition baths, for example in a reel-to-reel process. For instance, articles may be connected to a common conductive substrate (e.g., a strip). In some embodiments, each of the electrodeposition baths may be associated with separate anodes and the interconnected individual articles may be commonly connected to a cathode.

In some embodiments, the invention provides coated articles that are capable of resisting corrosion, and/or protecting an underlying substrate material from corrosion, in one or more potential corrosive environments. Examples of such corrosive environments include, but are not limited to, aqueous solutions, acid solutions, alkaline or basic solutions, or combinations thereof. For example, coated articles described herein may be resistant to corrosion upon exposure to (e.g., contact with, immersion within, etc.) a corrosive environment, such as a corrosive liquid, vapor, or humid environment.

The corrosion resistance may be assessed using tests such as ASTM B845, entitled "Standard Guide for Mixed Flowing Gas (MFG) Tests for Electrical Contacts" following the Class IIa protocol, may also be used to assess the corrosion resistance of coated articles. These tests outline procedures in which coated substrate samples are exposed to a corrosive atmosphere (i.e., a mixture of $NO_2$, $H_2S$, $Cl_2$, and $SO_2$). The mixture of flowing gas can comprise 200+/−50 ppb of $NO_2$, 10+/−5 ppb of $H_2S$, 10+/−3 ppb of $Cl_2$, and 100+/−20 ppb $SO_2$. The temperature and relative humidity may also be controlled. For example, the temperature may be 30+/−1° C., and the relative humidity may be 70+/−2%.

The low-level contact resistance of a sample may be determined before and/or after exposure to a corrosive environment for a set period of time according to one of the tests described above. In some embodiments, the low-level contact resistance may be determined according to specification EIA 364, test procedure 23. Generally, the contact resistivity of a sample may be measured by contacting the sample under a specified load and current with a measurement probe having a defined cross-sectional area of contact with the sample. For example, the low-level contact resistance may be measured under a load of 25 g, 50 g, 150 g, 200 g, etc. Generally, the low-level contact resistance decreases as the load increases.

In some embodiments, a coated article has reduced low-level contact resistance. Reduced low-level contact resistance may be useful for articles used in electrical applications such as electrical connectors. In some cases, an article may have a low-level contact resistance under a load of 25 g of less than about 100 mOhm; in some cases, less than about 10 mOhm; in some cases, less than about 5 mOhm; and, in some cases, less than about 1 mOhm. It should be understood that the article may have a low-level contact resistance outside this range as well. It should also be understood that the cross-sectional area of contact by the measurement probe may affect the value of the measured low-level contact resistance.

The following example should not be considered to be limiting but illustrative of certain features of the invention.

EXAMPLE

This example demonstrates coating thickness, tungsten content, grain size, coating hardness, and contact resistance achieved with various samples.

Coatings were electrodeposited on base materials in aqueous electrodeposition baths using an electrodeposition process. The electrodeposition baths contained a silver ionic species, a tungsten ionic species, and a complexing agent. The coatings were formed directly on the base material substrate. Additionally, for samples 28-35, a nickel layer was electrodeposited on the substrate prior to electrodepositing the silver-based alloy.

Tables 1 and 2 show the results obtained for these coatings.

TABLE 1

Thickness, tungsten content, grain size and hardness for various samples. N.D. = not determined.

| Sample | Thickness (microns) | Tungsten (atomic %) | Grain Size (nm) | Hardness (GPa) |
| --- | --- | --- | --- | --- |
| 1 | 2.9 | 1.0 | 22 | 2.4 |
| 2 | 3.1 | 1.5 | 20 | N.D. |
| 3 | 3.4 | 1.4 | 15 | N.D. |

TABLE 1-continued

Thickness, tungsten content, grain size and hardness for various samples. N.D. = not determined.

| Sample | Thickness (microns) | Tungsten (atomic %) | Grain Size (nm) | Hardness (GPa) |
| --- | --- | --- | --- | --- |
| 4 | 3.8 | 1.7 | 14 | 2.4 |
| 5 | 3.7 | 7.9 | 5 | 2.2 |
| 6 | 3.8 | 7.7 | 5 | 2.1 |
| 7 | 4.2 | 7.1 | 6 | N.D. |
| 8 | 4.1 | 6.4 | 7 | 1.6 |
| 9 | N.D. | 1.2 | N.D. | N.D. |
| 10 | 3.1 | 1.2 | 96 | 2.1 |
| 11 | 4.5 | 1.6 | N.D. | N.D. |
| 12 | 4.5 | 1.3 | 49 | N.D. |
| 13 | 9.8 | 1.4 | 55 | 2.6 |
| 14 | 7.5 | 1.4 | 49 | N.D. |
| 15 | 6.4 | 4.9 | 10 | 2.9 |
| 16 | 8.2 | 3.1 | 25 | 2.8 |
| 17 | 7.9 | 4.6 | 10 | 1.8 |
| 18 | 2.4 | 1.8 | 35 | 2.4 |

TABLE 2

Substrate, tungsten content, and contact resistance for various samples. N.D. = not determined.

| Sample | Substrate | Tungsten (atomic %) | Contact Resistance (milliohms) |
| --- | --- | --- | --- |
| 19 | brass | 1.3 | 4.6 |
| 20 | brass | 1.5 | 4.2 |
| 21 | brass | 2.9 | 6.8 |
| 22 | brass | 6.9 | 8.8 |
| 23 | brass | 7.0 | 7.2 |
| 24 | brass | 1.6 | 5.9 |
| 25 | brass | 1.9 | 5.3 |
| 26 | brass | 7.3 | 10.4 |
| 27 | brass | 5.5 | N.D. |
| 28 | Ni/brass | 1.8 | 7.7 |
| 29 | Ni/brass | 2.3 | 6.6 |
| 30 | Ni/brass | 6.8 | 8.4 |
| 31 | Ni/brass | 5.5 | 10.4 |
| 32 | Ni/brass | 0.9 | 6.6 |
| 33 | Ni/brass | 1.5 | 5.9 |
| 34 | Ni/brass | 6.7 | 8.4 |
| 35 | Ni/brass | 7.4 | 8.0 |

What is claimed:

1. An article, comprising:
    a base material; and
    a coating formed on the base material, the coating comprising a silver-based alloy, the silver-based alloy further comprising tungsten and/or molybdenum, wherein the silver-based alloy is a solid solution and the silver-based alloy has an average grain size of less than 1 micron or has an amorphous grain structure, wherein the coating further comprises a layer comprising nickel.

2. The article of claim 1, wherein the silver-based alloy has an average grain size of less than 100 nm.

3. The article of claim 1, wherein the coating is formed using an electrodeposition process.

4. The article of claim 1, wherein the coating is formed in a bath.

5. The article of claim 1, wherein the silver-based alloy has an average grain size less than 50% of a thickness of the coating.

6. The article of claim 1, wherein the coating has a thickness greater than about 5 microinches.

7. The article of claim 1, wherein the silver-based alloy has a face-centered cubic structure.

8. The article of claim 1, wherein the silver-based alloy is between 0.1 atomic percent and 50 atomic percent tungsten and/or molybdenum.

9. The article of claim 1, wherein the base material comprises copper.

10. The article of claim 1, wherein the coating further comprises a layer comprising Ru, Os, Rh, Re, Ir, Pd, Pt, Ag, Au, or a combination thereof.

11. The article of claim 1, wherein the silver-based alloy has an average grain size of less than 1 micron.

12. The article of claim 1, wherein the coating comprises a lubricant layer and the lubricant layer is formed as an upper portion of the coating.

13. The article of claim 1, wherein the silver-based alloy forms a layer of the coating.

14. The article of claim 13, wherein the silver-based alloy layer is formed directly on the base material.

15. The article of claim 14, wherein the silver-based alloy layer covers an entire surface of the base material.

16. The article of claim 13, wherein a second layer is formed on the silver-based alloy layer.

17. The article of claim 16, wherein the second layer covers an entire surface of the silver-based alloy layer.

18. The article of claim 16, wherein the second layer comprises Ru, Rh, or a combination thereof.

19. The article of claim 13, wherein the silver-based alloy layer of the coating is formed on a second layer of the coating.

20. The article of claim 1, wherein the concentration of tungsten and/or molybdenum in the silver-based alloy is at least 1.5 atomic percent.

21. The article of claim 1, wherein the concentration of tungsten and/or molybdenum in the silver-based alloy between 0.1 atomic percent and 20 atomic percent.

22. The article of claim 1, wherein the silver-based alloy is a silver-tungsten alloy.

23. The article of claim 22, wherein the coating is electroplated.

24. The article of claim 22, wherein the silver-based alloy has an average grain size of less than 1 micron.

25. The article of claim 22, wherein the silver-based alloy has an average grain size of less than 100 nm.

26. The article of claim 22, wherein the coating has a thickness greater than about 5 microinches.

27. The article of claim 22, wherein the silver-based alloy has a face-centered cubic structure.

28. The article of claim 22, wherein the silver-based alloy is between 0.1 atomic percent and 50 atomic percent tungsten.

29. The article of claim 22, wherein the concentration of tungsten in the silver-based alloy is at least 1.5 atomic percent.

30. The article of claim 22, wherein the concentration of tungsten in the silver-based alloy between 0.1 atomic percent and 20 atomic percent.

31. The article of claim 22, wherein the coating comprises a lubricant layer and the lubricant layer is formed as an upper portion of the coating.

32. The article of claim 22, wherein the silver-based alloy forms a layer of the coating.

33. The article of claim 22, wherein the silver-based alloy layer is formed directly on the base material.

34. The article of claim 33, wherein the silver-based alloy layer covers an entire surface of the base material.

35. The article of claim 32, wherein a second layer is formed on the silver-based alloy layer.

36. The article of claim 35, wherein the second layer covers an entire surface of the silver-based alloy layer.

37. The article of claim 35, wherein the second layer comprises Ru, Os, Rh, Re, Ir, Pd, Pt, Ag, Au, or a combination thereof.

38. The article of claim 36, wherein the second layer comprises Ru, Rh, or a combination thereof.

39. The article of claim 32, wherein the silver-based alloy layer of the coating is formed on a second layer of the coating.

40. The article of claim 22, wherein the article is an electrical connector.

41. The article of claim 1, wherein the silver-based alloy is a silver-molybdenum alloy.

42. The article of claim 1, wherein the article is an electrical connector.

43. The article of claim 1, wherein the base material is conductive.

44. An electrical component, comprising:
a conductive base material; and
a coating formed on the base material, the coating comprising a silver-based alloy, wherein the silver-based alloy is a solid solution, the silver-based alloy further comprising tungsten and/or molybdenum, wherein the silver-based alloy has an average grain size of less than 1 micron or has an amorphous grain structure, wherein the coating further comprises a layer comprising Ru, Os, Rh, Re, Ir, Pd, Pt, Ag, Au, or a combination thereof.

45. The electrical component of claim 44, wherein the conductive base material comprises copper.

46. The electrical component of claim 44, wherein the coating further comprises a layer comprising nickel.

47. The electrical component of claim 44, wherein the silver-based alloy has an average grain size of less than 100 nm.

48. The electrical component of claim 44, wherein the silver-based alloy has an average grain size less than 50% of a thickness of the coating.

49. The electrical component of claim 44, wherein the silver-based alloy is between 0.1 atomic percent and 50 atomic percent tungsten and/or molybdenum.

50. The electrical component of claim 44, wherein the coating has a thickness greater than about 5 microinches.

51. The electrical component of claim 44, wherein the coating is electroplated.

* * * * *